US012625006B2

(12) United States Patent
Chen et al.

(10) Patent No.: US 12,625,006 B2
(45) Date of Patent: May 12, 2026

(54) CURVED PRISM ARRAY APPLIED TO AN INFRARED SENSOR

(71) Applicant: Sensorlite Inc., New Taipei (TW)

(72) Inventors: Wen-Chin Chen, New Taipei (TW); Ai-Huan Lee, New Taipei (TW)

(73) Assignee: SENSORLITE INC., New Taipei City (TW)

( * ) Notice: Subject to any disclaimer, the term of this patent is extended or adjusted under 35 U.S.C. 154(b) by 884 days.

(21) Appl. No.: 17/945,377

(22) Filed: Sep. 15, 2022

(65) Prior Publication Data

US 2024/0094059 A1      Mar. 21, 2024

(51) Int. Cl.
*G01J 5/08*      (2022.01)
*G01J 5/00*      (2022.01)
*G01J 5/10*      (2006.01)

(52) U.S. Cl.
CPC ........... *G01J 5/0879* (2022.01); *G01J 5/0025* (2013.01); *G01J 5/10* (2013.01)

(58) Field of Classification Search
CPC .......... G01J 5/0879; G01J 5/0025; G01J 5/10; G02B 3/0037; G08B 13/193
See application file for complete search history.

(56) References Cited

U.S. PATENT DOCUMENTS

| | | | |
|---|---|---|---|
| 4,268,752 A | 5/1981 | Herwig et al. | |
| 4,271,360 A | 6/1981 | Ward | |
| 4,772,797 A * | 9/1988 | Kahl .................... | G08B 13/193 |
| | | | 340/567 |
| 6,653,635 B2 | 11/2003 | Liao et al. | |
| 2010/0176300 A1* | 7/2010 | Nishikawa ........... | G01J 5/0806 |
| | | | 250/349 |

* cited by examiner

*Primary Examiner* — John E Breene
*Assistant Examiner* — Manuel Salvador Castellon, Jr.
(74) *Attorney, Agent, or Firm* — MUNCY, GEISSLER, OLDS & LOWE, P.C.

(57) ABSTRACT

A curved prism array applied to an infrared sensor wherein: the infrared sensor comprises at least an infrared sensing element which is used in detecting infrared signals within a solid-angled FOV and installed inside the curved prism array; the curved prism array has an incident focal plane and a plurality of emergent focal planes, both of which are not parallel with each other, such that infrared signals beyond the solid-angled FOV are received by the incident focal plane, refracted through one of the emergent focal planes and guided toward the infrared sensing element for expansion of the solid-angled FOV of the infrared sensing element.

8 Claims, 7 Drawing Sheets

1

13

12

11

14

142

B1

141

CURVED PRISM ARRAY APPLIED TO AN INFRARED SENSOR

BACKGROUND OF THE INVENTION

1. Field of the Invention

The present application relates to a curved prism array applied to an infrared sensor, particularly a curved prism array with which a solid-angled FOV (field of view) of an infrared sensor is expanded.

2. Description of Related Art

Based on a difference between human temperature and ambient temperature, a general pyroelectric infrared sensing element which features a set of optical lenses made of high density polyethylene (HDPE) (for example, lenses, prisms or mirror planes) focuses human temperature-induced infrared rays with wavelengths ranging from 5 to 14 μm and project infrared radiation from human temperature on an embedded sensing element precisely for sensing human temperature of a person moving within a specific area.

In general, an infrared sensor is internally equipped with an optical element through which infrared radiation is focused and precisely projected on a sensing element mounted inside the infrared sensor. As shown in U.S. Pat. Nos. 4,268,752, 6,653,635 and 4,271,360, an ordinary infrared sensing element is equipped with an infrared filtration window through which infrared rays with wavelengths beyond 5-14 um are filtered out but criticized for a vertical field of view restricted by the dimensions of the filtration window. For expansion of the vertical field of view of an infrared sensor, a signal reflector installed correspondingly is used in focusing incident rays outside the vertical field of view of the infrared sensor on different focal points for projection of incident rays on the infrared sensing element.

The above design, however, is criticized for drawbacks like complicated structure, oversize, increased costs for materials and machining, and assembly and deserves to be corrected in other solutions.

Accordingly, a curved prism array for expansion of the solid-angled FOV of an infrared sensor is designed in the present application. For the application in an infrared sensor, the curved prism array, which is able to expand the solid-angled FOV of an infrared sensing element inside the infrared sensor and detect infrared signals beyond the solid-angled FOV, can be regarded as a good solution.

SUMMARY OF THE INVENTION

The present disclosure relates to a curved prism array applied to an infrared sensor. The infrared sensor comprises at least an infrared sensing element which is used in detecting infrared signals within a solid-angled FOV and installed inside the curved prism array wherein: the curved prism array has an incident focal plane and a plurality of emergent focal planes facing toward the infrared sensing element; each of the emergent focal planes and the incident focal plane, both of which form an optical focusing structure with an uneven thickness, are not parallel to each other such that the infrared sensing element features an expanded solid-angled FOV; the incident focal plane contacted by an incident infrared ray beyond the solid-angled FOV refracts the incident infrared ray, which is subject to a focusing direction of the incident focal plane, at a specific angle such that an internal infrared ray entering a space between the incident focal plane and an emergent focal plane is guided to the emergent focal plane and further refracted at another specific angle under the effect of a focusing direction of the emergent focal plane for development of an emergent infrared ray that emits toward the infrared sensing element for an expanded solid-angled FOV of the infrared sensing element.

Specifically, each of the emergent focal planes created in a cutting process is an optical surface through which infrared rays are focused within a solid-angled FOV of the infrared sensing element.

Specifically, the solid-angled FOV comprises a vertical field of view and a horizontal field of view.

Specifically, each of the emergent focal planes has a first endpoint and a second endpoint, both of which are opposite to the incident focal plane, wherein a distance from the first endpoint to the incident focal plane is greater than another distance from the second endpoint to the incident focal plane such that the emergent focal plane and the incident focal plane are not parallel to each other.

Specifically, a thickness from the first endpoint to the incident focal plane is less than 1.2 mm.

Specifically, a thickness from the second endpoint to the incident focal plane is greater than 0.25 mm.

Specifically, the incident focal plane is either a curved surface or a planar surface.

Specifically, the emergent focal plane is either a curved surface or a planar surface.

Specifically, incident infrared rays for the same detection point are parallel to one another and emergent infrared rays refracted through different emergent focal planes are focused within a vertical field of view of the infrared sensing element for enhancing signal gain of an identical detection distance.

Specifically, the infrared sensing element is a pyroelectric infrared sensing element.

DETAILED DESCRIPTION OF THE PREFERRED EMBODIMENTS

DETAILED DESCRIPTION OF THE PREFERRED EMBODIMENTS

The technical contents, features and effects of a curved prism array applied to an infrared sensor are clearly explained in preferred embodiments and accompanying drawings as follows.

Figure 1:
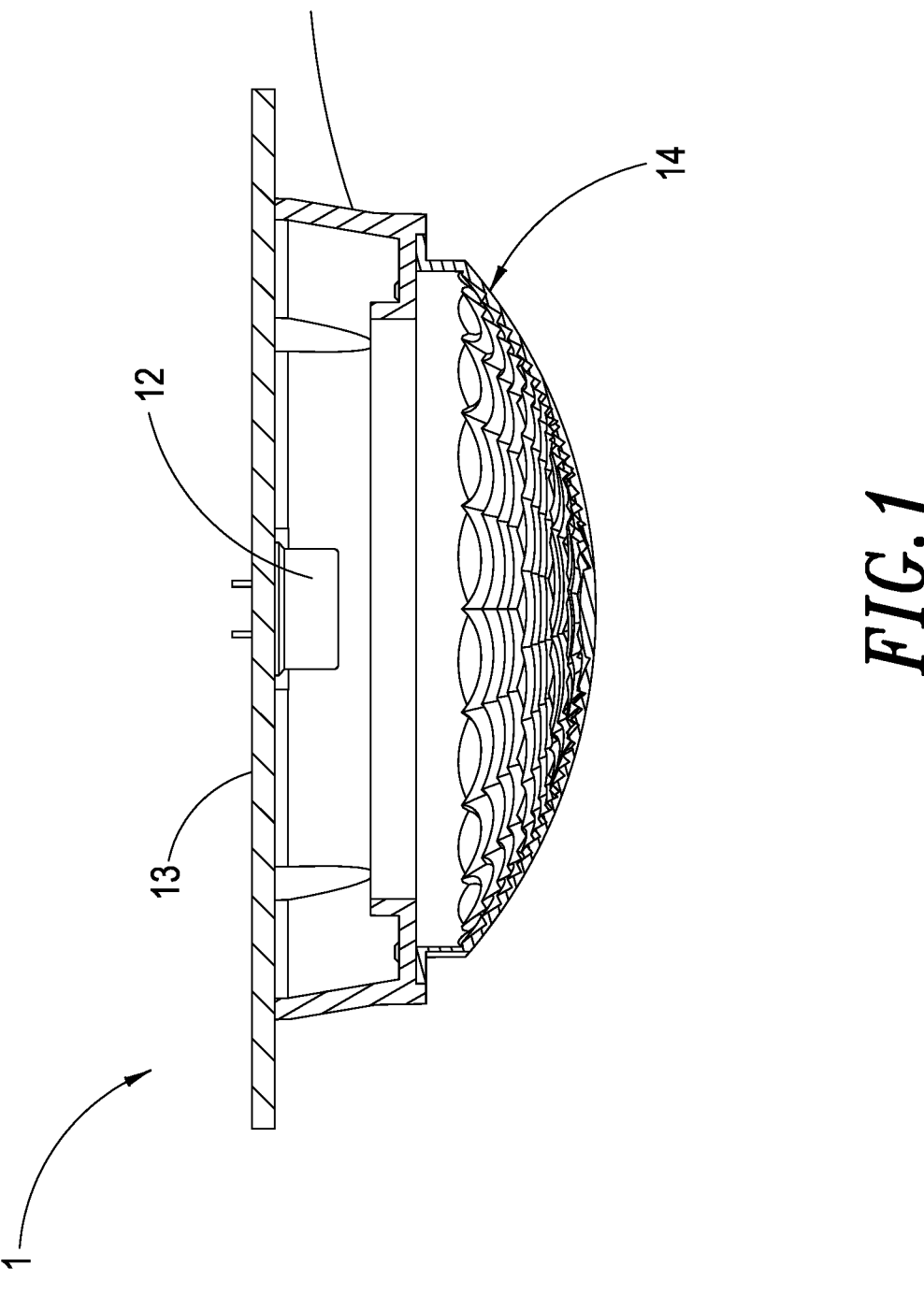
FIG. 1 is a schematic sectional view of a curved prism array applied to an infrared sensor.

Referring to FIG. 1, which is a sectional view for structure of a curved prism array applied to an infrared sensor. As shown in FIG. 1, an infrared sensor 1 comprises a base 11, an infrared sensing element 12 mounted on the base 11, a circuit board 13 and a curved prism array 14 wherein the infrared sensing element 12 is a pyroelectric infrared sensing element.

The circuit board 13 which is electrically connected with the infrared sensing element 12 is used in receiving infrared signals of a solid-angled FOV (field of view) detected by the infrared sensing element 12.

Figure 2A:
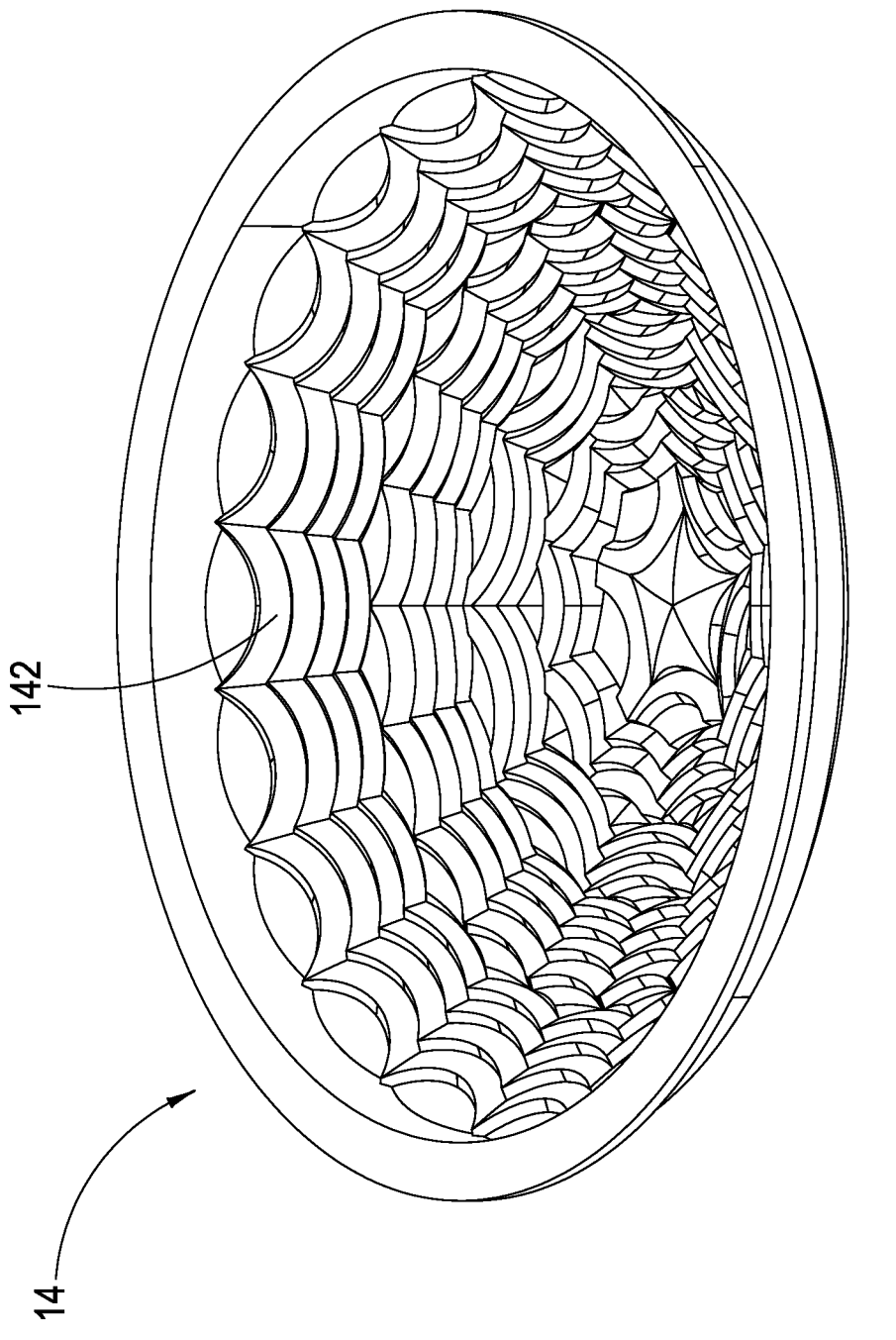
FIG. 2A is a schematic perspective view of a curved prism array applied to an infrared sensor.
Figure 2B:
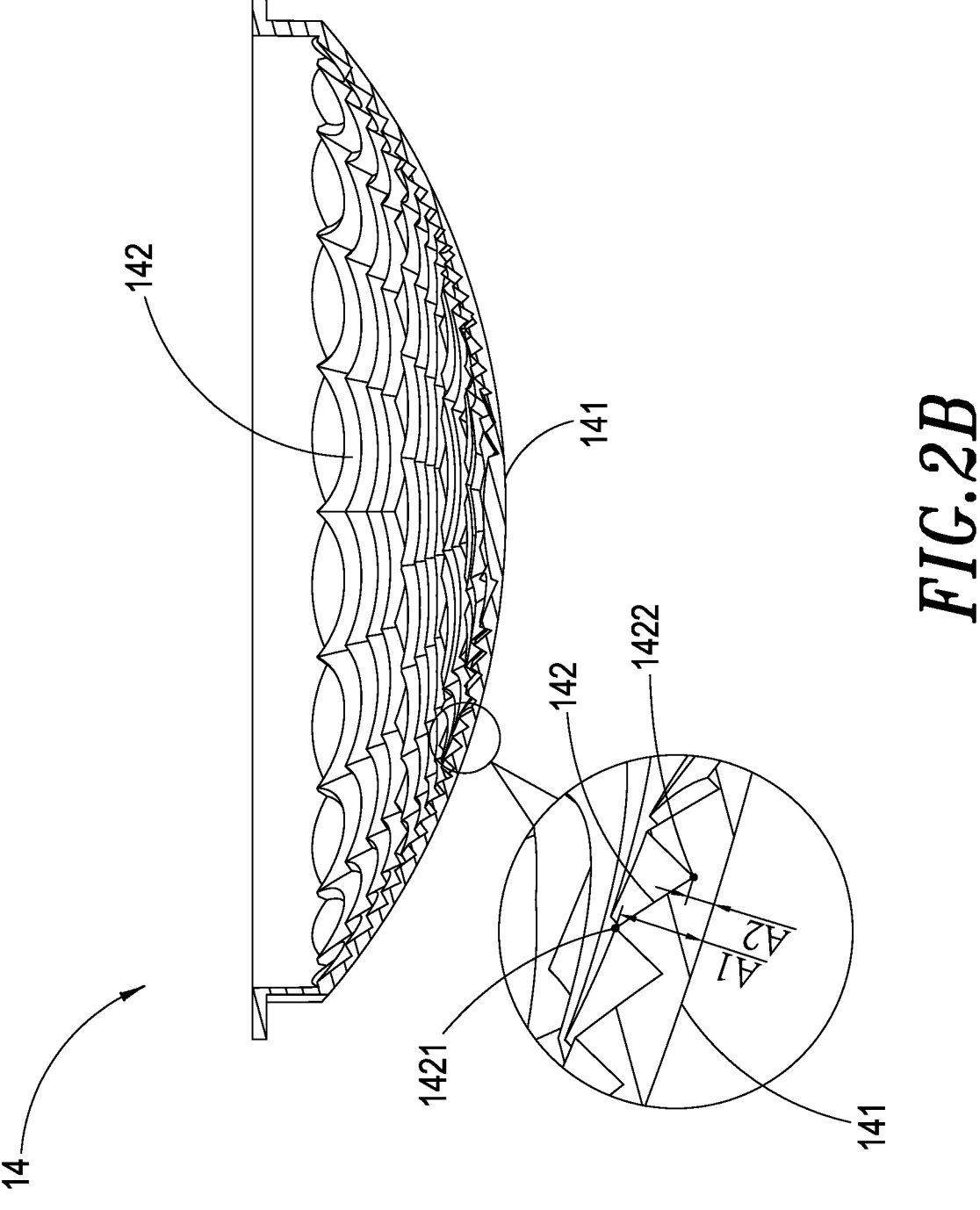
FIG. 2B is a schematic sectional view of a curved prism array applied to an infrared sensor.
Figure 2C:
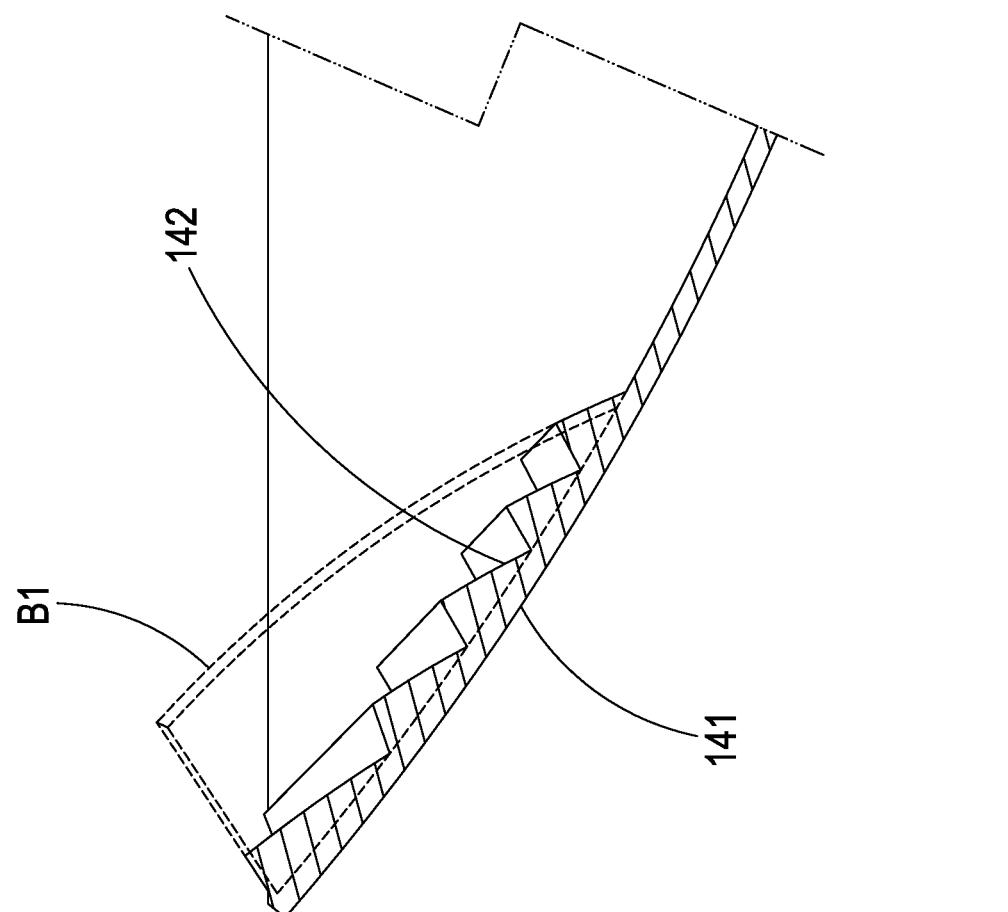
FIG. 2C is a schematic view of a curved prism array with a cut thickness in a curved prism array applied to an infrared sensor.

As shown in FIGS. 2A and 2B, the curved prism array 14 features an incident focal plane 141 opposite to a detected scene (a detected object) and a plurality of emergent focal planes 142. As shown in FIG. 2C, each of the emergent focal planes 142 that are developed with an emergent focal plane B1 of an original prism cut is an optical surface through which infrared rays are focused within a solid-angled FOV of the infrared sensing element 12.

The curved prism array 14 has an outer surface which features a single incident focal plane 141 or alternatively an incident focal plane 141 with multiple curved surfaces/planar surfaces.

The curved prism array 14 is able to expand the solid-angled FOV of the infrared sensing element 12 and the solid-angled FOV includes a vertical field of view and a horizontal field of view.

There will be curvatures of two surfaces based on the incident focal plane 141 and the emergent focal plane 142, both of which are curved surfaces.

There will be one curvature of a surface based on the incident focal plane 141, which is a curved surface, rather than the emergent focal plane 142, which is a planar surface.

There will be one curvature of a surface based on the emergent focal plane 142, which is a curved surface, rather than the incident focal plane 141, which is a planar surface.

As shown in FIG. 2B, there are a first endpoint 1421 and a second endpoint 1422 on the incident focal plane 141 opposite to each emergent focal plane 142 and one thickness A1 from the first endpoint 1421 to the incident focal plane 141 is greater than another thickness A2 from the second endpoint 1422 to the incident focal plane 141 such that the emergent focal plane 142 and the incident focal plane 141 are not parallel to each other and incident infrared rays from the incident focal plane 141 are refracted by multiple emergent focal planes 142 and focused within a solid-angled FOV of the infrared sensing element 12.

A focal plane in the present disclosure (that is, the incident focal plane 141 or the emergent focal plane 142) means an optical surface perpendicular to the normal and develops a focal point on which incident rays are focused.

The emergent focal planes 142 and the incident focal plane 141 opposite to the emergent focal planes 142 form a curved prism array being similar to a biconvex lens and featuring an uneven thickness wherein one of the incident focal planes 141 and the corresponding emergent focal plane 142 are not parallel to each other (or parallel to each other partially, not parallel to each other partially or not parallel to each other entirely) but match each other to focus light through curved surfaces. Moreover, one of the emergent focal planes 142 and the corresponding incident focal plane 141, both of which are not parallel to each other, make infrared rays reflective and projected within a solid-angled FOV of the infrared sensing element 12 during either long-distance detection or short-distance detection.

The emergent focal plane 142 is an optical surface through which light rays are focused within a solid-angled FOV of the infrared sensing element 12. However, energy of infrared ray signals will be attenuated by a significant thickness between the incident focal plane 141 and the emergent focal plane 142. For no attenuation in energy of infrared ray signals due to a significant thickness as shown in FIG. 2C, an emergent focal plane B1 at the inner surface of an original curved prism array 14 is cut for development of multiple emergent focal planes 142 (the thickness for the emergent focal plane B1 of an original prism is cut down for creation of multiple emergent focal planes 142 but the curved surface of the emergent focal plane B1 on an original prism is unchanged).

For no attenuation in energy of infrared ray signals, a thickness A1 from the first endpoint 1421 to the incident focal plane 141 is less than 1.2 mm.

For no adverse impact on each segment of a prism to be expansively filled in an HDPE injection molding process due to an undersized thickness, a thickness A2 from the second endpoint 1422 to the incident focal plane 141 is greater than 0.25 mm.

Figure 3:
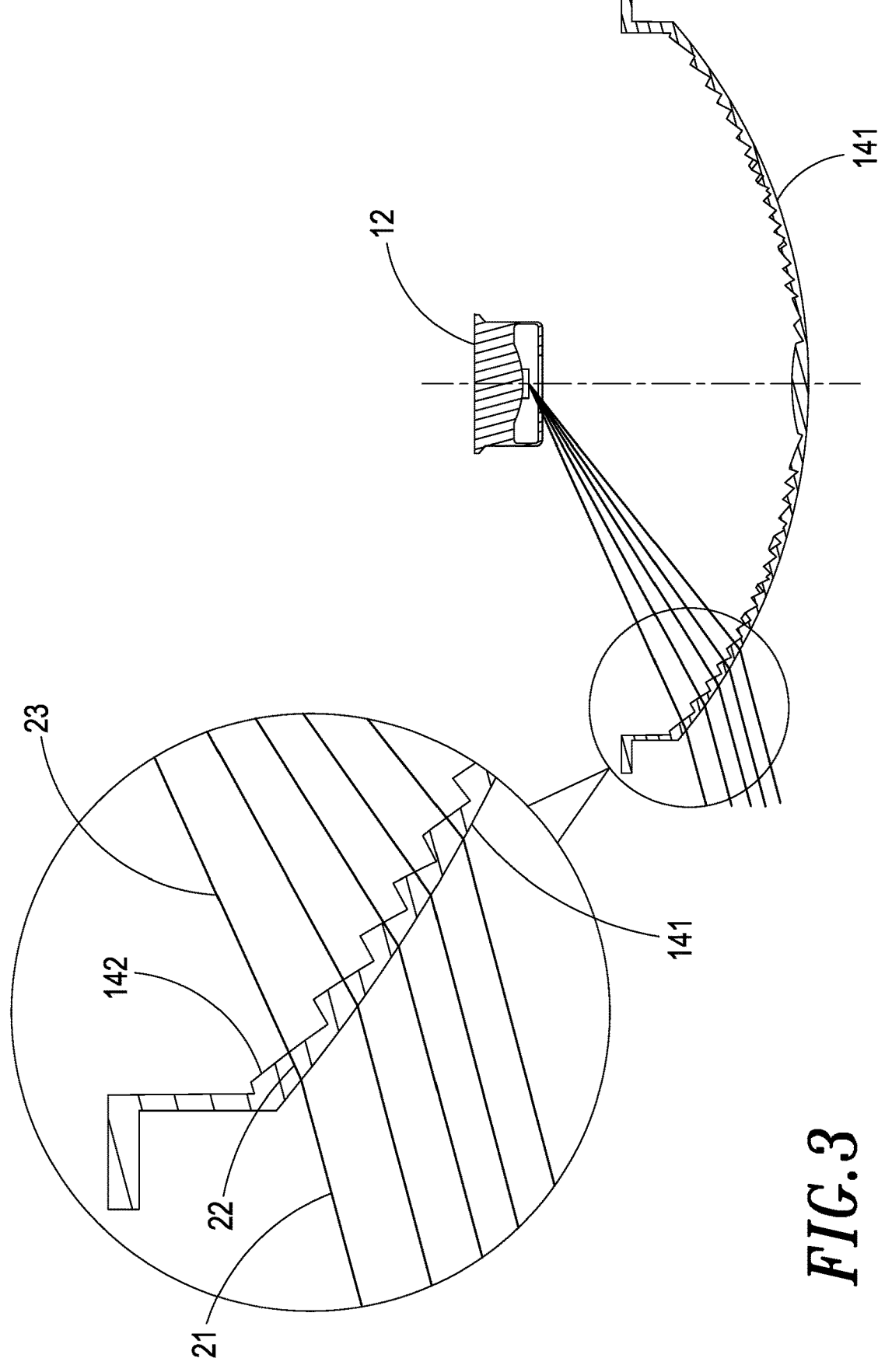
FIG. 3 is a schematic view for an application of a curved prism array applied to an infrared sensor.

In an embodiment of the present disclosure as shown in FIG. 3, an incident infrared ray 21, which is subject to the incident focal plane 141 contacted by the incident infrared ray 21, is refracted at a specific angle according to the Snell's Law (refraction of light is contingent on media of two substances for the incident focal plane 141 and the emergent focal plane 142 in the present disclosure) and enters the curved prism array 14 along an optical path for an internal infrared ray 22.

The internal infrared ray 22, which is subject to the emergent focal plane 142 contacted by the internal infrared ray 22, is refracted at a specific angle according to the Snell's Law and moves toward a region detected by the infrared sensing element 12 along an optical path for an emergent infrared ray 23.

It can be seen from above descriptions that the vertical field of view is expanded and closed to maximum 180 degrees (or lessened and less than 180 degrees) by adjusting orientations of the incident focal plane 141 and the emergent focal plane 142.

It can be seen from above descriptions that that the horizontal field of view is expanded and closed to maximum 360 degrees (or lessened and less than 360 degrees) by adjusting orientations of the incident focal plane 141 and the emergent focal plane 142.

As shown in one embodiment in FIG. 3, five incident infrared rays 21 (the outmost incident infrared ray is marked as "21" not labeled on each of other four incident infrared rays), which are parallel with one another and emit toward the same detection point, are refracted through the emergent focal planes 142 and the emergent infrared rays 23 are focused within the vertical field of view of the infrared sensing element 12 for the stronger signal gain of an identical detection distance.

Figure 4A:
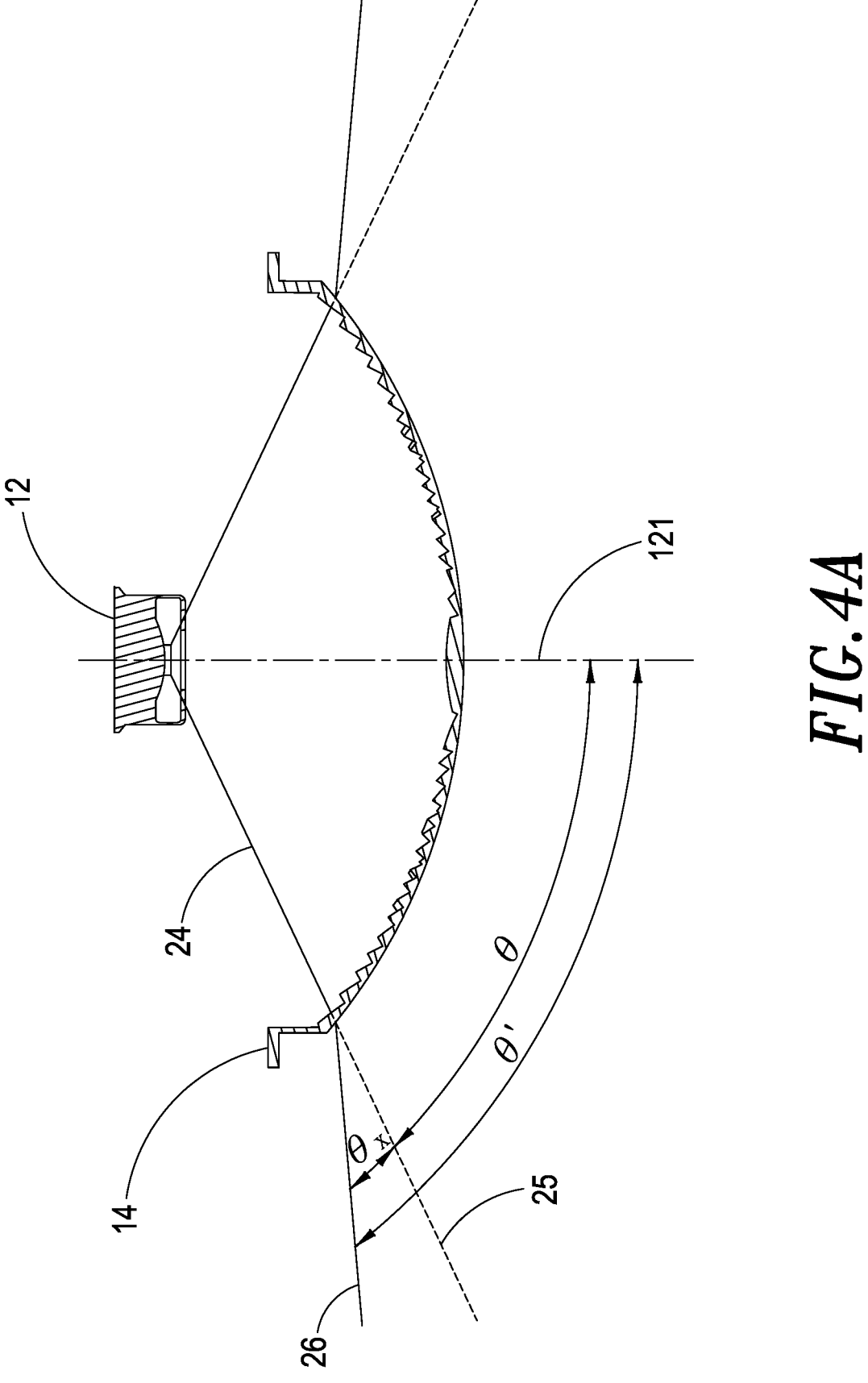
FIG. 4A is a schematic view of an expanded vertical field of view for a curved prism array applied to an infrared sensor.

The present application is aimed at expansion of a solid-angled FOV of the infrared sensing element 12. As shown in FIG. 4A, expansion of a vertical field of view is described as follows:

(1) The test based on a general lens (Note: A general lens not drawn in FIG. 4A is represented by the prism in a schematic view for its limited effect) shows the outmost detectable region, that is, the incident infrared ray 25 which is the outmost detectable boundary line. In the case of the incident infrared ray 25 penetrating a general lens and the emergent infrared ray 24 moving toward the infrared sensing element 12, the maximum detectable region of a general lens is fixed at the angle of θ away from the normal 121 of an infrared sensing element.

(2) In the case of installation of a curved prism array 14 mentioned in the present disclosure, the detectable region is expanded outward and represented by the outmost boundary line, that is, an incident infrared ray 26. When the incident infrared ray 26 penetrates the curved prism array 14, the emergent infrared ray 24 moves toward the infrared sensing element 12.

(3) Compared with a general lens, the curved prism array 14 in the present disclosure expands the maximum detectable region by an angle of $\theta_x$, that is, the maximum detectable region of the curved prism array 14 is $\theta'$ ($\theta'=\theta+\theta_x$) away from the normal 121 of the infrared sensing element 12. Accordingly, for detection of a broader solid-angled FOV, the vertical field of view of a solid-angled FOV for the infrared sensing element 12 is expanded by the curved prism array 14.

Figure 4B:
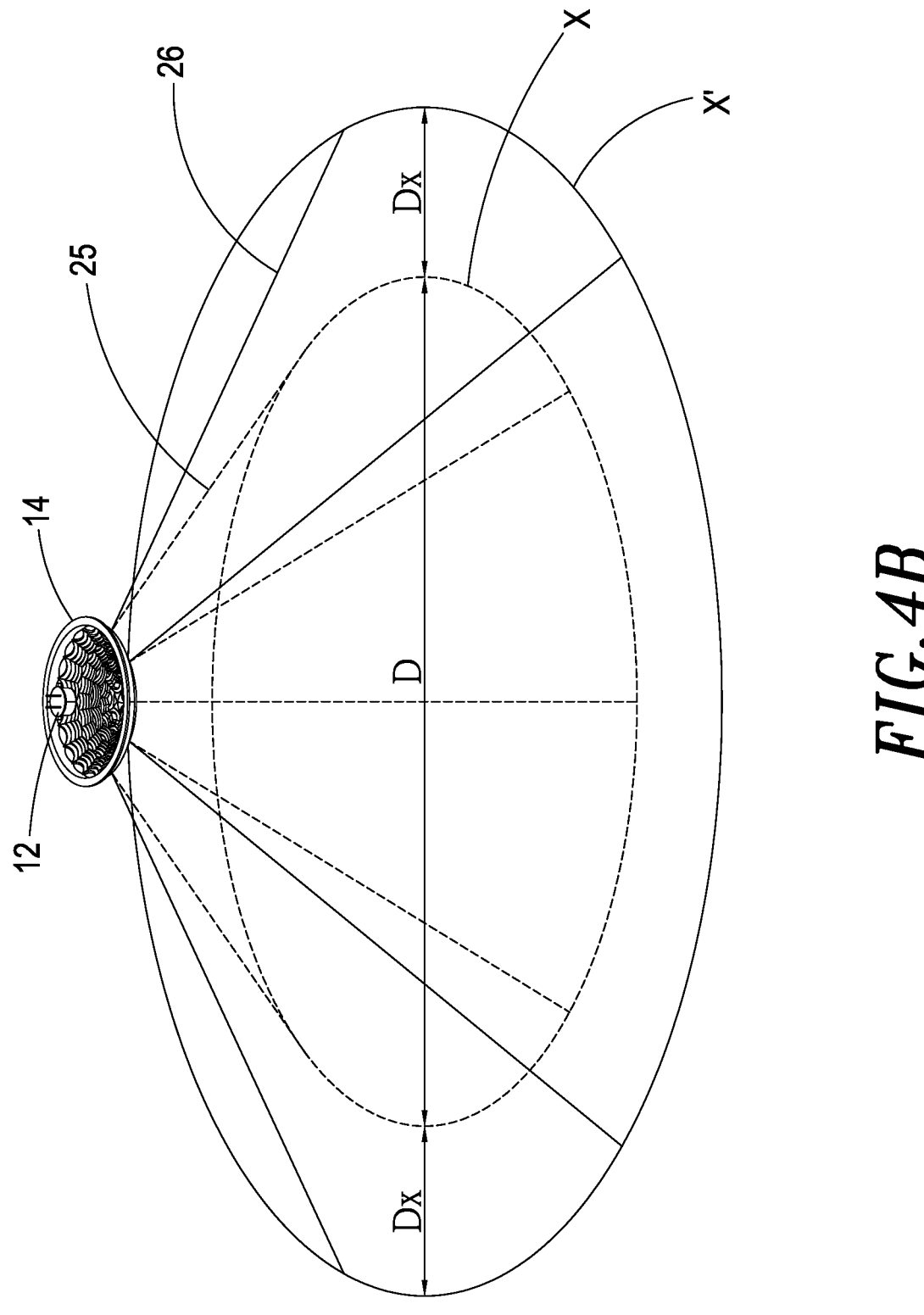
FIG. 4B is a schematic view of an expanded horizontal field of view for a curved prism array applied to an infrared sensor.

Continuing the descriptions in FIG. 4A, expansion of a horizontal field of view as shown in FIG. 4B is described as follows:

(1) The infrared sensing element 12 matches up with a general lens featuring a maximum detectable region limited to a fixed angle of $\theta$ that defines a fixed sensing area X and a maximum fixed sensing distance D correspondingly.

(2) In the case of installation of a curved prism array 14 mentioned in the present disclosure, the expanded detectable region refers to $\theta'$ ($\theta'=\theta+\theta_x$) from which an expanded sensing distance Dx and an expanded sensing distance Dx are derived due to $\theta_x$. Accordingly, an expanded sensing area X' is defined with the curved prism array 14 applied, that is, the horizontal field of view of a solid-angled FOV (greater than the detectable default solid-angled FOV) for the infrared sensing element 12 is expanded by the curved prism array 14.

A curved prism array applied to an infrared sensor in the present disclosure features following advantages compared with other conventional techniques:

(1) A curved prism array for an expanded detectable region of an infrared sensor designed in the present disclosure proves effective in expanding the vertical field of view of an infrared sensing element approximate to 180 degrees and also expanding the horizontal field of view of an infrared sensing element approximate to 360 degrees, each of which surpasses an initial detectable solid-angled FOV of the infrared sensing element.

(2) An incident focal plane or an emergent focal plane in the present disclosure can be either a curved surface or a planar surface optionally for an expanded solid-angled FOV and refraction or focus of light rays through a changed curvature of an outer focal plane which is designed flexibly.

(3) The focal length contingent on a prism's outer plane cannot be too short or long. Thus, the outer plane of a curved surface is beneficial for a lens or a prism detecting long and short distances.

A curved prism array applied to an infrared sensor has been disclosed in preferred embodiments which are not taken as examples to restrict the scope of the present application. Any change and/or modification made by the skilled persons who have general knowledge in the art and familiarize themselves with the above technical features and embodiments without departing from the spirit and scope of the present disclosure should be covered in claims of the patent specification.

6

What is claimed is:

1. A curved prism array applied to an infrared sensor which comprises at least an infrared sensing element which is used in detecting infrared signals within a solid-angled FOV and installed inside the curved prism array, wherein the curved prism array comprises:

an incident focal plane; and a plurality of emergent focal planes facing toward the infrared sensing element, wherein each of the emergent focal planes and the incident focal plane, both of which form an optical focusing structure with an uneven thickness, are not parallel to each other such that the infrared sensing element features an expanded solid-angled FOV; the incident focal plane contacted by an incident infrared ray beyond the solid-angled FOV refracts the incident infrared ray, which is subject to a focusing direction of the incident focal plane, at a specific angle such that an internal infrared ray entering a space between the incident focal plane and an emergent focal plane is guided to the emergent focal plane and further refracted at another specific angle under the effect of a focusing direction of the emergent focal plane for development of an emergent infrared ray that emits toward the infrared sensing element for an expanded solid-angled FOV of the infrared sensing element, wherein each of the emergent focal planes has a first endpoint and a second endpoint, both of which are opposite to the incident focal plane, and a distance from the first endpoint to the incident focal plane is greater than another distance from the second endpoint to the incident focal plane such that the emergent focal plane and the incident focal plane are not parallel to each other, and wherein a thickness from the second endpoint to the incident focal plane is greater than 0.25 mm.

2. The curved prism array applied to an infrared sensor as claimed in claim 1, wherein each of the emergent focal planes created in a cutting process is an optical surface through which infrared rays are focused within a solid-angled FOV of the infrared sensing element.

3. The curved prism array applied to an infrared sensor as claimed in claim 1, wherein the solid-angled FOV comprises a vertical field of view and a horizontal field of view.

4. The curved prism array applied to an infrared sensor as claimed in claim 1, wherein a thickness from the first endpoint to the incident focal plane is less than 1.2 mm.

5. The curved prism array applied to an infrared sensor as claimed in claim 1, wherein the incident focal plane is either a curved surface or a planar surface.

6. The curved prism array applied to an infrared sensor as claimed in claim 1, wherein the emergent focal plane is either a curved surface or a planar surface.

7. The curved prism array applied to an infrared sensor as claimed in claim 1, wherein incident infrared rays for the same detection point are parallel to one another and emergent infrared rays refracted through different emergent focal planes are focused within a vertical field of view of the infrared sensing element for enhancing signal gain of an identical detection distance.

8. The curved prism array applied to an infrared sensor as claimed in claim 1, wherein the infrared sensing element is a pyroelectric infrared sensing element.

\* \* \* \* \*